Patented Feb. 20, 1951

2,542,565

UNITED STATES PATENT OFFICE 2,542,565

ACETOACETIC-ARYLIDES

Robert Prescott Parker, Somerville, George Raymond Waitkins, Flemington, and Frederic Henry Adams, Bound Brook, N. J., assignors to American Cyanamid Company, New York, N. Y., a corporation of Maine No Drawing. Application August 17, 1945, Serial No. 611,223

3 Claims. (Cl. 260—562)

This invention relates to new chemical compounds represented by the formula:

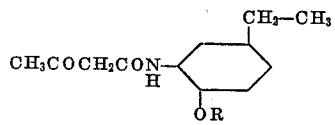

wherein R is an alkyl radical selected from the group consisting of methyl and ethyl radicals.

It has been discovered that the products of the present invention are extremely valuable intermediates for the production of water insoluble azo dyestuffs; particularly for production of yellow azo pigments with new color shades of very high tinctorial strength and highly specific resistance to fading by the action of ultra-violet light.

Azo pigments have been prepared from various acetoacet arylides and diazotized amines free from water solubilizing groups. The compounds are in general yellow pigments, many of which are characterized by clean, bright shade and good solvent resistance. A number of them, however, have been unsatisfactory in some applications because they are tinctorially weak, and in other applications their poor resistance to the fading action of ultra-violet light, commonly referred to as lack of permanency, precludes their use. Among the better known pigments of this class are those derived from tetrazotized benzidines, and particularly from tetrazotized 3,3'-dichlorbenzidine. Some of these pigments suffer less from tinctorial weakness than the class in general but lack permanency. For example, when tetrazotized 3,3'-dichlorbenzidine is coupled with acetoacet-2'-methoxy-5'-methylanilide (acetoacet cresidide), a yellow pigment of red shade is obtained. Ordinarily the substitution of a methyl group by an ethyl group produces in a molecule as large as in the dyestuffs derived from the acetoacet arylides of the present invention only minor differences in shade, and other properties normally are not materialy affected. The acetoacet arylides of the present invention, however, show a surprising difference from their next lower cresidide homologues. For example, the pigment obtained from tetrazotized 3,3'-dichlorbenzidine and acetoacet-2'-methoxy-5'-ethylanilide shows a tinctorial strength 20% greater than its lower homologue when dispersed in lithographic varnish. The pigment also shows a fuller depth of masstone, and a greener and cleaner undertone, and accordingly a purer tint on reduction with zinc oxide. This permits the use of the pigment in printing inks where the redder shade, dirtier undertone, and duller tint of its lower homologue preclude its use. It happens often with azo dyes that improvement in one characteristic is partially offset by other undesirable characteristics so that most dyes represent a compromise. In the present case the new green shade and high strength is obtained without any lack of permanency. In fact the pigment is somewhat superior to its lower homologue in permanency, even though the latter is unusual among the yellow acetoacet arylide pigments in having reasonably good permanency.

The above properties which are not deducible from the known related dyestuffs, render the products of the present invention of great practical importance in the fields of printing inks and paints.

The present invention will be described in greater detail in conjunction with the following specific examples. The parts are by weight.

EXAMPLE I

*Acetoacet-2'-methoxy-5'-ethylanilide*

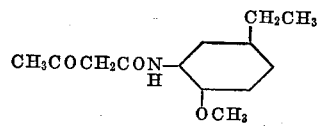

5 parts of diketene dissolved in 16 parts of acetone are added to a solution of 7 parts of 2-methoxy-5-ethylaniline in 24 parts of acetone in a suitable reaction vessel equipped with a reflux condenser. Heat is evolved from the reaction. This mixture is refluxed for 2 hours, and the acetone is then distilled off. Crystallized from ethyl alcohol, acetoacet-2'-methoxy-5'-ethylanilide forms white flakes which melt at 88–89° C.

This material is readily soluble in cold dilute aqueous caustic alkali, from which solution it is precipitated by the addition of acid.

The 2-methoxy-5-ethylaniline used in the above preparation is prepared in the following manner: 2-nitro-4-ethyl phenol dissolved in xylene is refluxed with dimethyl sulfate in the presence of potassium carbonate, the resulting solution is clarified, the xylene removed by distillation and the 2-nitro-4-ethylanisole is distilled, the boiling point being 179° C. at 28 mm. of mercury pressure. This intermediate is reduced by the customary procedure with iron and dilute acetic acid, and the 2-methoxy-5-ethylaniline is

EXAMPLE II

*Acetoacet-2'-ethoxy-5'-ethylanilide*

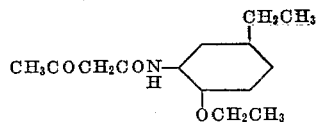

7 parts of 2-ethoxy-5-ethylaniline are dissolved in 16 parts of acetone, and the resulting solution is treated with 5.25 parts of diketene dissolved in 16 parts of acetone. The resulting mixture evolves heat from the reaction. It is refluxed for 1 hour in a suitable vessel equipped with a condenser. At the end of this period, the acetone is distilled off and the residue is purified by solution in dilute aqueous alkali, clarification and neutralization of the filtrate with acetic acid. When crystallized from alcohol, acetoacet-2'-ethoxy-5'-ethylanilide melts at 105–106° C.

This compound is readily soluble in dilute aqueous caustic alkali and is reprecipitated by addition of acid.

The 2-ethoxy-5-ethylaniline used in the above preparation is obtained from 2-nitro-4-ethyl phenol by the same procedure as described in Example 1 for the synthesis of 2-methoxy-5-ethylaniline by substituting an equivalent quantity of diethyl sulfate for the dimethyl sulfate taken therein. The resulting 2-ethoxy-5-ethyl aniline distills at 135–137° C. at 13 mm. of mercury pressure, and has a setting point of 27.5° C.

isolated by steam distillation. It melts at 54–55° C. (corr.)

We claim:

1. Chemical compounds represented by the formula:

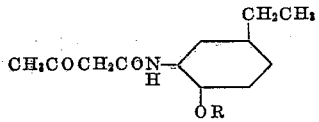

wherein R is an alkyl radical selected from the group consisting of methyl and ethyl radicals.

2. A compound according to claim 1 wherein R is methyl.

3. A compound according to claim 1 wherein R is ethyl.

ROBERT PRESCOTT PARKER.
GEORGE RAYMOND WAITKINS.
FREDERIC HENRY ADAMS.

REFERENCES CITED

The following references are of record in the file of this patent:

UNITED STATES PATENTS

| Number | Name | Date |
|---|---|---|
| 2,112,764 | Dahlen et al. | Mar. 29, 1938 |
| 2,142,594 | Zitscher et al. | Jan. 3, 1939 |

FOREIGN PATENTS

| Number | Country | Date |
|---|---|---|
| 256,621 | Germany | Feb. 14, 1913 |